Patented Sept. 30, 1947

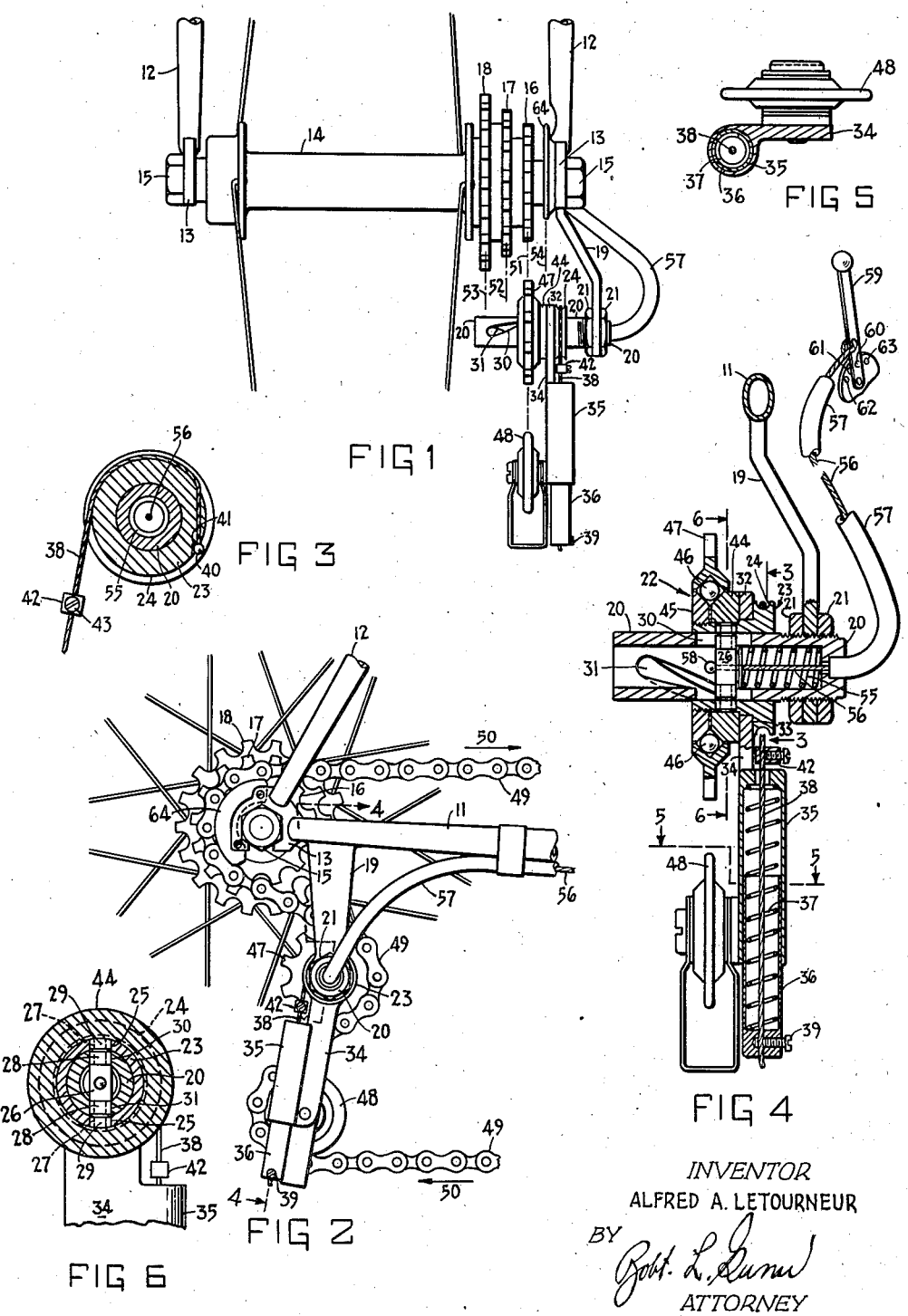

2,428,166

UNITED STATES PATENT OFFICE 2,428,166

GEARSHIFT FOR BICYCLES AND THE LIKE

Alfred Albert Letourneur, Beverly Hills, Calif.

Application June 12, 1944, Serial No. 539,944

5 Claims. (Cl. 74—217).

This invention relates to bicycles and the like and deals particularly with an improvement in a gear shift for vehicles of this character.

The invention to be set forth hereinafter is shown and described in connection with a bicycle, but it will become evident to those skilled in this art that it may be used in power driven vehicles and machinery with advantageous results.

The conventional gear shift for bicycles usually comprises three speeds which entails the use of three sprockets of different diameters on the hub of the rear wheel. The sprockets in turn are driven by a chain which runs over a front sprocket that is ordinarily propelled by foot power. However, as before stated, the front sprocket may be driven by power if desired. The gear shifting mechanism works in connection with the rear sprockets. Its function is to shift the chain from one gear to another while the chain is in motion. In this way the gear ratio is changed between the front sprocket and the rear sprocket, with a consequent change in speed. In gear shifts of this type it is customary to have a movable auxiliary sprocket or pulley for shifting the chain and an idler roller for taking up the slack in the chain resulting from the different positions on the sprockets. One of the difficulties encountered in gear shifts of this type was the fact that the idler roller could not exert a uniform pressure against the chain in all the gear positions. Normally, in the old type of gear shifts, the tension in the chain increases as the chain is mounted on the larger gears. In my invention, the tension may be held uniform or may be even made to increase on the smaller gears. Accordingly, it becomes the primary object of this invention to provide, in a gear shift of the character described, means whereby the force exerted on the idling roller to keep the chain taut may be predeterminedly varied to supply the tension desired in the chain for the different gear ratios involved in the gear shifting arrangement.

Another object of this invention is to provide an additional shifting position in a gear shift of the above character, operable by the same shifting means that shifts the chain from one sprocket to another, that will shift the chain completely off the sprockets and on to a stationary rest which will support the chain in an out-of-the-way position so that the entire rear wheel assembly, including the sprockets and the hub, may be removed without interference by the chain.

A more specific object is to provide an idler roller, in a gear shifting arrangement of the character described, mounted upon a swinging arm, wherein the force that tends to rotate the arm is automatically controlled by the axial movement of the chain shifting sprocket.

Other objects and advantages will become apparent as the description proceeds in conjunction with the drawings in which:

Figure 1 is a fragmentary view of the rear hub of a bicycle showing my invention as it would be applied to a conventional gear shifting arrangement;

Figure 2 is a side elevation of Figure 1 with a chain added;

Figure 3 is a sectional view on line 3—3 of Figure 4;

Figure 4 is a sectional view on line 4—4 of Figure 2;

Figure 5 is a sectional view on line 5—5 of Figure 4; and

Figure 6 is a sectional view on line 6—6 of Figure 4.

Referring to the drawings, it will be seen that I have shown a fragmentary part of a bicycle frame comprising rear horizontal fork members 11 which are joined to vertically extending members 12. The rear fork members 11 terminate in a slotted member 13 to which the member 12 is attached. A hub 14 of conventional design is mounted in the members 13 in the ordinary manner and is held therein by nuts 15. The hub 14 carries three sprockets 16, 17, and 18 of different diameters, which are for the purpose of driving the rear wheel of the bicycle. Depending from one of the members 11 is an arm 19 that carries on its lower end a tubular member 20. This member may be mounted at the lower end of the arm 19 in any suitable manner, such as by nuts 21 screw threadedly mounted on the member 20 on opposite sides of the arm 19 such as is shown in Figures 1 and 4. Upon the member 20, I mount an assemblage generally designated 22 which is slidable as a unit upon the member 20. It will be observed that the unit 22 consists of a member 23 adapted to be slidably and rotatably mounted upon the member 20. It will also be observed that one end of the member 23 is formed in the shape of a pulley as indicated at 24. The purpose of this pulley will be explained later. Also, by referring to Figure 6, it will be seen that the member 23 is provided with a pair of diametrically spaced holes 25. These holes are for the purpose of receiving a pin 26 which is provided with reduced end portions 27. Mounted upon each end portion 27 are a roller 28 and a spacer ferrule 29 which are adapted to fit into the openings 25 in the member 23.

By referring to Figures 1 and 4, it can be seen that the unit 20 is provided with spiral slots 30 and 31 diametrically placed on the member 20 and in opposition to each other. The rollers 28 described in connection with the member 23 are adapted to fit within the slots and rotate the member 23 on the member 20 by axial movement of the member 23 on the member 20. The amount of movement of course will depend upon the helixangle of the slot, and this may be made to provide the amount of movement desired. Also mounted on the member 23 is a member 32 which is rotatably mounted thereon and bears against a shoulder 33 formed by the pulley 24. The member 32 carries a depending arm 34 which, by virtue of being rotatably mounted upon the member 23, is swingable with respect to the unit 22. The arm 34 carries a tube 35 as an integral part thereof. It is to be understood that the tube 35 may be a separate part mounted upon the arm if so desired. Slidably mounted within the tube 35 in a telescoping arrangement is a tube 36. In the interior of the tubes 35 and 36, I mount a spring 37 which exerts a normal pressure to extend the telescopic arrangement. To overcome this normal tendency to extend, I connect a cable 38 to the lower end of the tube 36 by any suitable means, such as a screw 39, and allow the cable to extend outwardly through the top of the tube 35 and up and over the pulley 24 of the member 23 to which it is attached in any suitable manner, such as by a head 40 bearing against a shoulder 41. On the cable 38, I may attach a stop member 42 which is adjustably mounted thereon by means of a screw 43 for the purpose of stopping the expansion of the members 35 and 36 at a predetermined point. The purpose of this arrangement will become evident as the description proceeds.

The member 32 is rotatably held on the member 23 by means of a half ball race 44, which in turn is held in place by the other half of the race 45 screw threadedly mounted on the member 23. Rotatably mounted upon balls 46, supported in the ball race just described, is a sprocket 47. From the foregoing description it can be seen that, as the assembly 22 is moved axially along the member 20, the whole assembly is forced to turn on the member 20 by means of the rollers 28 working in the helical slots 30 and 31. This will have no effect upon the sprocket 47 except to move it axially along the member 20. However, the rotation of the unit 22 turns the pulley 24 which exerts more force upon the cable 38, which in turn will exert a greater force tending to rotate the arm 34 in a clockwise direction about the member 22. If the unit 22 is moved in the opposite direction, the force is decreased. It will be noted that on the lower end of the arm there is mounted an idling roller 48 which is for the purpose of taking up slack in a chain 49 shown in Figure 2. This increase or decrease in the tendency of the arm 34 to rotate about its axis is utilized to bring about the advantages of my invention.

In operation, the chain 49 travels in the direction of the arrows 50 and is propelled in the ordinary manner by a forward sprocket which is not shown. The chain is fed around the roller 48 and in reverse order over the auxiliary sprocket 47 and then in the ordinary manner over one of the sprockets 16, 17, or 18, thence back to the driving sprocket. Assuming that the chain passes over the sprockets as shown in Figures 1 and 2, the gear ratio would be of a high order. This would be the high speed position designated by line 51 and the other positions would be the intermediate designated by line 52, the low designated by line 53, and a fourth position designated by line 54. It is to be understood that the sprocket 47 may be shifted into any one of these positions by moving along the member 20.

The means for moving the sprocket and its attending assemblage along the member 20 consists of a compression spring 55 arranged inside the member 22 to exert a normal pressure for moving the assemblage outwardly on the member. As a means of controlling this tendency of the assemblage to move outwardly on the member 20, I provide a control cable 56, ordinarily enclosed in a guard 57, which is attached to the pin 26 in any suitable manner such as a head 58 which holds the entire assemblage against movement. The means for moving the cable 56 may take a variety of forms and may be mounted any place desired on the bicycle. For this purpose I have shown a hand operated lever 59 suitably mounted upon the bicycle at any desirable point not shown. The cable 56 is connected to the lever as shown. The lever is adapted to be held in four positions, 60, 61, 62, and 63, which correspond to the positions 51, 52, 53, and 54, respectively, of the sprocket 47.

Taking up first the position 51 of the sprocket 47, it will be observed that the tension put upon the chain 49 by means of the idler 48 is proportional to the tension placed in the cable 38. This tension in turn is controlled by the position of the member 23 on the member 20. The member 23, as before described, is fixed with respect to rotation on the member 20 by its axial position along the member 20. It can therefore be seen, as the assembly 22 moves along the member 20 to the position 52 for instance, the member 23 is rotated on the member 20 anti-clockwise, thereby reducing the tension in the cable 38, which in turn reduces the tendency of the arm 34 to swing clockwise. It will be further observed that, as the chain is moved from position 51 to 52, it mounts a sprocket of larger diameter and therefore shortens the chain between the forward driving sprocket and the rear sprocket 17. The aforedescribed reduction in the tendency of the arm 34 to rotate clockwise will be seen to permit the chain to shorten and thereby swing the arm counter-clockwise with substantially the same tension in the chain. The same is true with respect to position 53. The arrangement just described can therefore be seen to provide a means of supplying a substantially uniform tension in the chain for all sprockets. The tension may be made uniform or the device may be so designed that an increase or decrease in the tension of the chain for the different gear ratios may be had. For instance, it may be advisable to design the device so that a tighter tension is applied on the high speed ratio. This can be accomplished through the design of the spiral slots in the member 20. The position 54 is for the purpose of mounting the chain upon a stationary bracket so that the rear hub assembly may be removed without entanglement with the chain.

Referring to Figures 1 and 2 for a description of how the chain may be mounted in position 54, it will be observed that I have fixed a small plate 64 upon the member 13. This plate may take the form of an arcuate dished member which is attached to the member 13 in any suitable manner, such as by screws. In practice, the chain is mounted upon the plate 64 in the same manner as it is mounted upon the sprockets; that is, by shifting the sprocket 47 into line with position 54, the chain automatically climbs onto the bracket 64 the same way it climbs onto the sprockets 16, 17, and 18. When mounted in this manner, the entire rear assembly may be dropped out of the bicycle and the chain will be suspended upon the frame, thus holding the gear shifting arrangement in position so that it will not interfere with the removal of the parts. The stop 42 on the cable 38 plays an important part in removing the chain from the bicycle. It is obvious that as soon as the chain is removed the arm 34 will swing clockwise and unless stopped it will swing up and into engagement with the sprocket 47 and interfere with the handling of the parts for removal or repair. The stop 42 engages the end of the barrel 35 and allows the cable 38 to swing the arm only so far, thus preventing it from interfering with the other part of the device while the chain is off the front sprocket.

I claim:

1. In a gear shift having a plurality of sprockets of different diameters adapted to be consecutively engaged by a chain, an auxiliary sprocket slidable axially for selectively guiding said chain on to said sprockets, a spring pressed idling roller arranged to engage said chain and exert a pressure thereagainst, and means controlled by the axial position of said auxiliary sprocket for regulating the pressure applied to said chain by said roller.

2. In a gear shift having a plurality of sprockets of different diameters adapted to be consecutively engaged by a chain, an auxiliary sprocket rotatably mounted on a shaft and axially slidable thereon for selectively guiding said chain on to said sprockets, a swinging arm supported on said shaft, an idling roller on said arm adapted to engage said chain, spring actuated means for forcing said arm to swing about said shaft and cause said roller to exert a pressure against said chain, and means for controlling said spring actuated means by the axial position of said auxiliary sprocket on said shaft to regulate the pressure exerted by said roller against said chain.

3. In a gear shift having a plurality of sprockets of different diameters adapted to be consecutively engaged by a chain, an auxiliary shaft suitably supported adjacent said sprockets, there being spiral slots in said shaft, a collar rotatably and slidably mounted on said shaft, said collar having inwardly extending members movably engaging said slots, an auxiliary sprocket rotatably mounted on said collar for selectively guiding said chain on to said sprockets, an arm swingably mounted on said collar, an idling roller on said arm adapted to engage said chain, spring means mounted between said collar and said arm for forcing said arm to swing and cause said roller to exert a pressure against said chain, and means for moving said collar axially on said shaft to guide said chain on to different sprockets of said plurality of sprockets and at the same time rotate said collar to regulate the pressure applied by said roller against said chain in accordance with the axial position of said auxiliary sprocket on said auxiliary shaft.

4. In a gear shift having a plurality of sprockets of different diameters adapted to be consecutively engaged by a chain, an auxiliary shaft suitably supported adjacent said sprockets, there being spiral slots in said shaft, a collar rotatably and slidably mounted on said shaft, said collar having inwardly extending members movably engaging said slots, an auxiliary sprocket rotatably mounted on said collar for selectively guiding said chain on to said sprockets, an arm swingably mounted on said collar, an idling roller on said arm adapted to engage said chain, a barrel mounted on said arm, a spring in said barrel having the lower end free and the upper end secured in said barrel, a cable extending longitudinally through said barrel and attached to the lower end of said spring, the other end of said cable being attached to a circumferential point on said collar to cause said arm to swing and force said roller to exert a pressure against said chain, and a stop on said cable arranged to engage the end of said barrel at a predetermined position to stop the force exerted by said spring to swing said arm.

5. In a gear shift having a plurality of sprockets of different diameters adapted to be consecutively engaged by a chain, a fixed bracket adjacent said sprockets adapted to hold said chain in an out-of-the-way position, and an auxiliary sprocket slidable axially for selectively guiding said chain on to said sprockets and said bracket.

ALFRED ALBERT LETOURNEUR.

REFERENCES CITED

The following references are of record in the file of this patent:

UNITED STATES PATENTS

| Number | Name | Date |
|---|---|---|
| 2,108,941 | Morgan | Feb. 22, 1938 |
| 2,099,477 | Gruyer | Nov. 16, 1937 |

FOREIGN PATENTS

| Number | Country | Date |
|---|---|---|
| 464,135 | Great Britain | Apr. 12, 1937 |
| 314,214 | Italy | Jan. 20, 1934 |